United States Patent
Salomonsson

(10) Patent No.: US 12,286,070 B2
(45) Date of Patent: Apr. 29, 2025

(54) VEHICULAR SAFETY SYSTEM FOR CONTROLLING A SAFETY FEATURE

(71) Applicant: MAGNA ELECTRONICS INC., Auburn Hills, MI (US)

(72) Inventor: Ove J. Salomonsson, Farmington Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 135 days.

(21) Appl. No.: 18/456,576

(22) Filed: Aug. 28, 2023

(65) Prior Publication Data

US 2023/0406249 A1    Dec. 21, 2023

Related U.S. Application Data

(63) Continuation of application No. 18/151,539, filed on Jan. 9, 2023, now Pat. No. 11,738,705, which is a continuation of application No. 17/301,684, filed on Apr. 12, 2021, now Pat. No. 11,548,461, which is a continuation of application No. 15/929,326, filed on Apr. 27, 2020, now Pat. No. 10,974,674, which is a continuation of application No. 16/363,006, filed on Mar. 25, 2019, now Pat. No. 10,632,950, which is a continuation of application No. 15/911,465, filed on Mar. 5, 2018, now Pat. No. 10,239,479, which is a continuation of application No. 14/929,493, filed on Nov. 2, 2015, now Pat. No. 9,908,495, which is a continuation of application No. 13/653,577, filed on Oct. 17, 2012, now Pat. No. 9,174,574.

(Continued)

(51) Int. Cl.
*G08B 21/00* (2006.01)
*B60Q 9/00* (2006.01)
*B60R 21/0134* (2006.01)
*B60R 21/01* (2006.01)

(52) U.S. Cl.
CPC .......... *B60R 21/0134* (2013.01); *B60Q 9/008* (2013.01); *B60R 2021/01252* (2013.01)

(58) Field of Classification Search
CPC ...... B60R 21/0134; B60R 2021/01252; B60Q 9/008
USPC ......................................... 340/425.5; 701/45
See application file for complete search history.

(56) References Cited

U.S. PATENT DOCUMENTS

| | | |
|---|---|---|
| 5,193,029 A | 3/1993 | Schofield et al. |
| 5,550,677 A | 8/1996 | Schofield et al. |

(Continued)

*Primary Examiner* — Mark S Rushing
(74) *Attorney, Agent, or Firm* — HONIGMAN LLP

(57) ABSTRACT

A vehicular safety system includes a plurality of vehicular cameras disposed at a vehicle. Image data captured by a forward-viewing vehicular camera of the plurality of vehicular cameras is processed by the vehicular safety system for headlamp control and for lane departure warning and/or object detection. At least one other sensing system of the vehicle is operable to capture sensor data. Responsive at least in part to processing by the vehicular safety system of captured image data and captured sensor data, a potential collision involving the vehicle is determined. Responsive to determination of the potential collision involving the vehicle, a safety feature of the vehicle changes its condition. If actual collision does not occur, the safety feature returns to its condition that existed prior to determination of the potential collision.

49 Claims, 2 Drawing Sheets

Related U.S. Application Data

(60) Provisional application No. 61/548,902, filed on Oct. 19, 2011.

(56) References Cited

U.S. PATENT DOCUMENTS

| | | |
|---|---|---|
| 5,670,935 A | 9/1997 | Schofield et al. |
| 5,715,093 A | 2/1998 | Schierbeek et al. |
| 5,760,962 A | 6/1998 | Schofield et al. |
| 5,786,772 A | 7/1998 | Schofield et al. |
| 5,796,094 A | 8/1998 | Schofield et al. |
| 5,877,897 A | 3/1999 | Schofield et al. |
| 5,934,750 A | 8/1999 | Fohl |
| 6,215,518 B1 | 4/2001 | Watkins |
| 6,294,989 B1 | 9/2001 | Schofield et al. |
| 6,313,454 B1 | 11/2001 | Bos et al. |
| 6,353,392 B1 | 3/2002 | Schofield et al. |
| 6,396,397 B1 | 5/2002 | Bos et al. |
| 6,498,620 B2 | 12/2002 | Schofield et al. |
| 6,690,268 B2 | 2/2004 | Schofield et al. |
| 6,721,659 B2 | 4/2004 | Stopczynski |
| 6,806,452 B2 | 10/2004 | Bos et al. |
| 6,824,281 B2 | 11/2004 | Schofield et al. |
| 6,830,278 B2 | 12/2004 | Yoshizawa et al. |
| 6,882,287 B2 | 4/2005 | Schofield |
| 6,946,978 B2 | 9/2005 | Schofield |
| 7,004,606 B2 | 2/2006 | Schofield |
| 7,005,974 B2 | 2/2006 | McMahon et al. |
| 7,038,577 B2 | 5/2006 | Pawlicki et al. |
| 7,123,168 B2 | 10/2006 | Schofield |
| 7,344,261 B2 | 3/2008 | Schofield et al. |
| 7,388,182 B2 | 6/2008 | Schofield et al. |
| 7,526,103 B2 | 4/2009 | Schofield et al. |
| 7,611,196 B2 | 11/2009 | Terada et al. |
| 7,614,690 B2 | 11/2009 | Matsubayashi et al. |
| 7,618,091 B2 | 11/2009 | Akaike et al. |
| 7,695,015 B2 | 4/2010 | Breed |
| 7,720,580 B2 | 5/2010 | Higgins-Luthman |
| 7,881,496 B2 | 2/2011 | Camilleri et al. |
| 7,914,187 B2 | 3/2011 | Higgins-Luthman et al. |
| 8,346,438 B2 | 1/2013 | Breed |
| 9,174,574 B2 | 11/2015 | Salomonsson |
| 9,908,495 B2 | 3/2018 | Salomonsson |
| 10,239,479 B2 | 3/2019 | Salomonsson |
| 10,632,950 B2 | 4/2020 | Salomonsson |
| 10,974,674 B2 | 4/2021 | Salomonsson |
| 11,548,461 B2 | 1/2023 | Salomonsson |
| 11,738,705 B2 | 8/2023 | Salmonsson |
| 2002/0113876 A1 | 8/2002 | Kim |
| 2007/0046450 A1* | 3/2007 | Iwama .................. G01S 11/12 |
| | | 340/436 |
| 2007/0109406 A1 | 5/2007 | Schofield et al. |
| 2007/0120657 A1 | 5/2007 | Schofield et al. |
| 2008/0004775 A1* | 1/2008 | Iyoda .................... B60N 2/888 |
| | | 701/45 |
| 2008/0067841 A1* | 3/2008 | Matsubayashi ........ B60N 2/888 |
| | | 297/216.12 |
| 2008/0122591 A1* | 5/2008 | Schofield ................ B60R 1/12 |
| | | 340/425.5 |
| 2010/0020170 A1 | 1/2010 | Higgins-Luthman et al. |
| 2011/0115615 A1 | 5/2011 | Luo et al. |
| 2012/0062743 A1 | 3/2012 | Lynam et al. |
| 2013/0002873 A1 | 1/2013 | Hess |
| 2013/0006469 A1 | 1/2013 | Green et al. |
| 2013/0054103 A1* | 2/2013 | Herink .................... B60T 7/22 |
| | | 701/65 |

\* cited by examiner

VEHICULAR SAFETY SYSTEM FOR CONTROLLING A SAFETY FEATURE

CROSS REFERENCE TO RELATED APPLICATIONS

The present application is a continuation of U.S. patent application Ser. No. 18/151,539, filed Jan. 9, 2023, now U.S. Pat. No. 11,738,705, which is a continuation of U.S. patent application Ser. No. 17/301,684, filed Apr. 12, 2021, now U.S. Pat. No. 11,548,461, which is a continuation of U.S. patent application Ser. No. 15/929,326, filed Apr. 27, 2020, now U.S. Pat. No. 10,974,674, which is a continuation of U.S. patent application Ser. No. 16/363,006, filed Mar. 25, 2019, now U.S. Pat. No. 10,632,950, which is a continuation of U.S. patent application Ser. No. 15/911,465, filed Mar. 5, 2018, now U.S. Pat. No. 10,239,479, which is a continuation of U.S. patent application Ser. No. 14/929,493, filed Nov. 2, 2015, now U.S. Pat. No. 9,908,495, which is a continuation of U.S. patent application Ser. No. 13/653,577, filed Oct. 17, 2012, now U.S. Pat. No. 9,174,574, which claims the filing benefit of U.S. provisional application Ser. No. 61/548,902, filed Oct. 19, 2011, which is hereby incorporated herein by reference in its entirety.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, such as rearwardly of the vehicle, and provides the communication/data signals, including camera data or image data that is processed and, responsive to such image processing, a vehicle safety system is operable to provide a vehicle safety feature, such as adjustment of a vehicle headrest or the like, so as to properly position the headrest in response to a detection of an imminent rear collision.

These and other objects, advantages, purposes and features of the present invention will become apparent upon review of the following specification in conjunction with the drawings.

DESCRIPTION OF THE PREFERRED EMBODIMENTS

Figure 1:
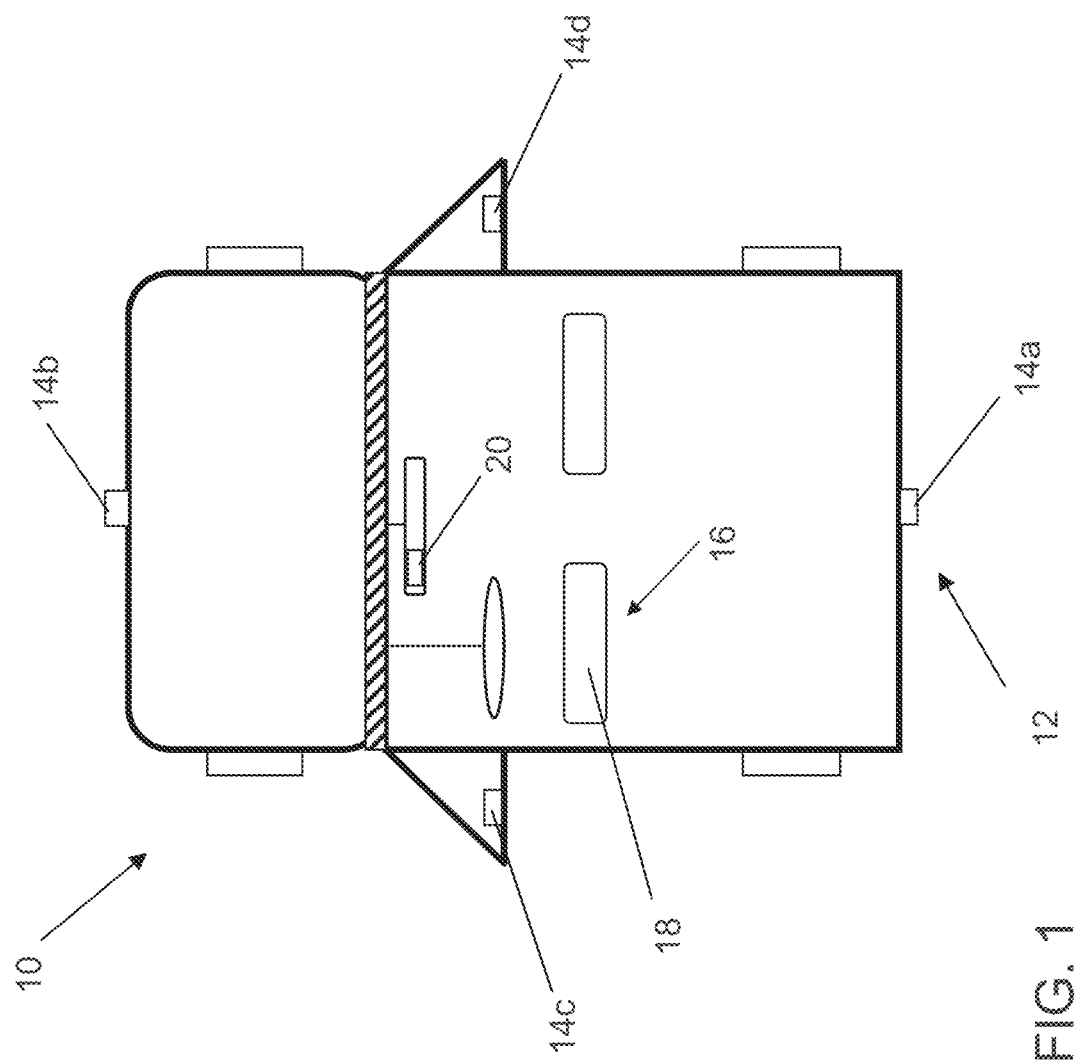
FIG. 1 is a plan view of a vehicle with a vision system and imaging sensor or camera that provides an exterior field of view for a vehicle safety system in accordance with the present invention.

Referring now to the drawings and the illustrative embodiments depicted therein, a vehicle 10 includes an imaging system or vision system 12 that includes at least one imaging sensor or camera (such as a rearward facing imaging sensor or camera 14a and/or optionally such as a forwardly facing camera 14b at the front (or at the windshield) of the vehicle, and/or a rearwardly and/or sidewardly facing camera 14c, 14d at the sides of the vehicle), which captures images exterior of the vehicle, and a vehicle safety system 16 (FIG. 1). The vision system 12 is operable to process image data captured by the camera (such as the rearwardly facing camera 14a) to detect a rearwardly approaching vehicle or object and to determine if and when the approaching vehicle or object is going to impact or collide with the subject vehicle. The safety system 16, responsive to an output of the vision system that is indicative of a detection of a pending or imminent or likely or potential rear collision by an object or vehicle rearward of the subject vehicle (such as an object approaching the subject vehicle from the rear or an object that the subject vehicle is approaching during a reversing maneuver), is operable to adjust the headrest or headrests 18 of the vehicle 10 to reduce potential harm to the occupant of the subject vehicle during such a rear collision, as discussed below.

As with all passive safety restraint functions in a vehicle, a concern is to detect a pending or imminent impact or collision fast enough to provide time to deploy countermeasures, such as restraints and the like, to protect the occupant. Because impact-based sensors only react after the actual impact occurs, the restraints have to be deployed within a very short time frame (in the range of 10 ms or thereabouts) so as to be in place before the occupant has moved too much in relation to the vehicle to enable an efficient and effective restraint or safety system. Thus, it is desirable that a collision or impact detection occur early enough to be able to use the detection to activate or commence safety measures.

Rear vision cameras are becoming standard equipment on many vehicles in the United States and such rear vision cameras or backup assist cameras are likely to proliferate to other regions as well. The present invention utilizes such a rear vision camera for pre-impact collision detection (such as via image processing of image data captured by a rearward facing camera to detect an approaching vehicle or object to the rear of the subject or host vehicle), and utilizes such pre-impact collision or imminent collision detection to provide a safety feature and/or passenger restraint feature and/or the like.

For example, a rearward facing pixelated imaging array or rearview camera may be disposed at the rear of a vehicle and may have a wide angle rearward field of view rearward of the subject vehicle. The image data captured by the camera (of the scene occurring rearwardly of the vehicle and in the rearward field of view of the camera) can be used to detect an imminent collision or impact (before the collision or impact actually occurs) by utilizing a vehicle detection algorithm or object detection algorithm to process the captured image data. The data processing and object detection and imminent collision or impact detection can be used to trigger a safety feature or the like. Thus, important safety features or benefits can be added to a vehicle without the need for any costly additional hardware or electronic components.

Figure 2:
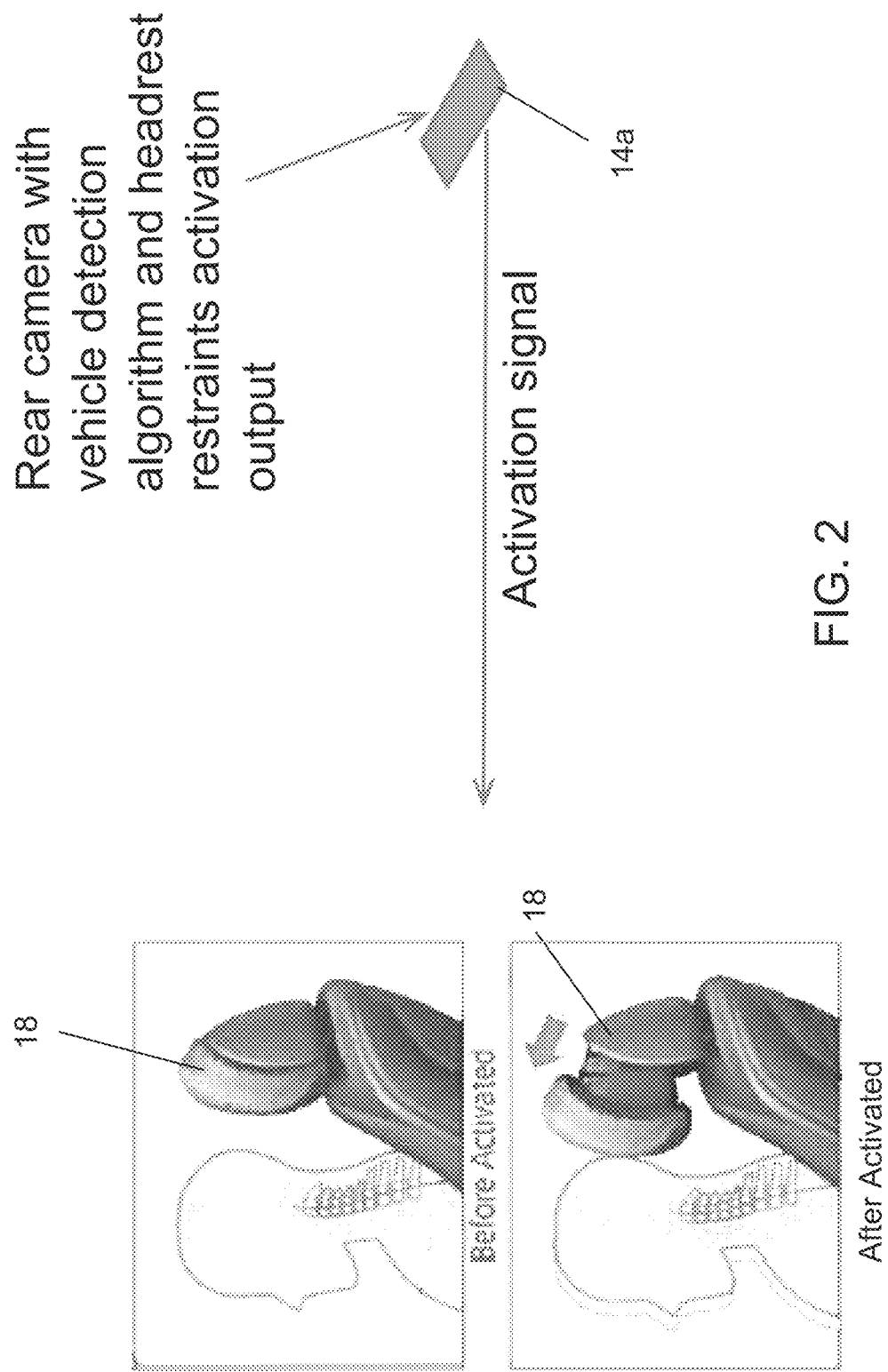
FIG. 2 is a diagram of a vehicle safety system in accordance with the present invention.

If the detection is early enough (pre-impact), the system may trigger or activate a restraint system that may use a less severe (slower and less energy) and less costly and reversible activation principle. For example, and with reference to FIG. 2, the rearward facing camera 14a and image processing of image data captured by the rearward facing camera may detect a rearwardly approaching object or vehicle and may determine if a collision or impact is likely or imminent or unavoidable or substantially unavoidable. For example, the system may be operable to detect a rapidly approaching object or vehicle in the camera's field of view, and optionally may take into account the size and/or shape and/or speed of the detected object/vehicle and/or the distance to the detected object/vehicle from the subject vehicle and/or the rate of approach of the detected object/vehicle towards the subject vehicle in determining whether or not the detected object is potentially a vehicle or large object that may harm the driver and/or passenger of the subject vehicle if an impact occurs. If the system determines that the detected object or vehicle is going to impact or is likely to impact the subject vehicle in such a way that may harm the driver and/or passenger (such as at an impact speed relative to the subject vehicle that is above a threshold level), the system may generate an alert or signal indicative of an imminent collision or impact. Responsive to such a signal, a passenger restraint system, such as a movable headrest system or the like, may be triggered or activated to move the headrest 18 (or portion of the headrest) forward and towards the then current location of the driver's or passenger's head so that, when the impact occurs, the rearward travel of the driver's or passenger's head is reduced or limited by the forward position of the headrest.

The rearward facing camera and the object or vehicle detection algorithm thus function to detect an imminent collision or impact and provide an activation output to a headrest restraint or adjustable headrest function before the impact occurs. The headrest or headrests are thus moved to a forward position just prior to the impact so that the rearward travel of the occupant's head is limited by the forward position of the headrest when the rear impact occurs. Optionally, the safety system may also be responsive to a seat occupancy detection system and may only adjust or move the headrest or headrests of a seat or seats that is/are occupied at the time that the imminent collision or impact is detected.

Optionally, other passenger restraints or safety features may be triggered or activated responsive to such a detection of an imminent collision or impact. For example, seat belts may be locked or restrained just prior to impact or airbags may be readied or "warmed up" for deployment (preferably without actually deploying the airbags until impact in case the impact is avoided) and/or the like.

Optionally, the image based pre-impact collision detection and output signal may be used as a part of other vehicle systems or of an overall safety system of the vehicle. For example, the detection and output system of the present invention may be used as a stand-alone system, a confirmation only sensor as part of a safety system, fusion of the image data output with other sensing systems such as, for example, ultrasonic sensing systems, pressure sensing systems and/or accelerometers and/or the like.

Optionally, the vision and safety system may be deactivated or the logic of the activation or operation may change when the reverse gear of the vehicle is engaged (indicating that a reversing maneuver is being undertaken by the driver of the vehicle). The system thus may actuate or control the safety feature (such as adjustment or movement of a headrest) further responsive to a signal or input indicative of the vehicle being shifted into a reverse gear. Optionally, when the vehicle is executing such a reversing maneuver, or when the vehicle is being driven down the road and a following vehicle is closely following or tailgating the subject vehicle, the system may function to generate an alert (such as a visual alert or tactile alert or audible alert) to alert the driver of the subject vehicle of a detected object or vehicle rearward of the subject vehicle. For example, the headrest may be moved forward (or optionally may be vibrated or otherwise moved or adjusted, such as via a vibrating element disposed at or in the headrest, or optionally may include a speaker or the like that is operable to generate an audible alert at the headrest) to provide a tactile or haptic alert to the driver to alert the driver that a rearward object has been detected, such as when the driver is reversing the vehicle and the system detects an object rearward of the subject vehicle and in the reversing path of the subject vehicle (and/or such as when the system detects an object or other vehicle closely following the subject vehicle and/or such as when the system detects an object or other vehicle approaching the subject vehicle from the rear at an approach rate or speed that is greater than a threshold approach rate). Such a headrest activation or control may utilize already existing cameras and image processor and headrest controls (which may adjust the position of the headrest responsive to a user input as part of a seat adjustment system), so that the safety/alert system may be provided without a significant cost increase to the vehicle manufacturer.

Optionally, the safety/alert system of the present invention may be operable to detect an approaching object or vehicle to the rear of the subject vehicle and, responsive to a determination of a rear collision, the safety/alert system may be operable to communicate with a telematics system of the vehicle. For example, the safety/alert system may contact a remote service provider or emergency service to alert the service of an accident so that emergency vehicles may be sent to the accident to provide the appropriate emergency services to the accident site as soon as possible. Optionally, the alert system may be operable to report the severity of the accident and may (such as via the speakers and microphones of the vehicle's telematics system) attempt to contact the vehicle occupants to determine the nature of any potential injuries. The system of the present invention thus may provide rear accident detection and may alert a remote service provider accordingly. Such an alert may be made independent of any deployment of airbags or the like (during a rear end collision, the airbags may not be deployed and thus known emergency telematics systems may not be responsive to such rear end collisions). The system may have connection to the telematics system with data download at Ignition off for the system and its rear camera.

Therefore, the present invention provides a vision system that is operable to detect a rearwardly approaching object or vehicle and that is operable to determine if the detected object or vehicle is likely to impact or collide with the rear of the subject vehicle. If such a pending collision is determined, the system generates a signal or output that actuates or triggers a safety feature of the vehicle so that the safety feature is activated before the actual impact occurs. Preferably, the triggered safety feature is a reversible feature (such as adjustment of the headrest or seat belt or seat setting or door locks or the like), such that if the collision is avoided or otherwise does not occur, the system can return the adjusted component or accessory (such as the headrest or seat belt or seat or door lock) to its normal position or setting (the position or setting that it was in prior to the detection of the imminent collision or impact).

The imaging sensor or camera that captures the image data for image processing may comprise any suitable camera or sensing device, such as, for example, an array of a plurality of photosensor elements arranged in 640 columns and 480 rows (a 640×480 imaging array), with a respective lens focusing images onto respective portions of the array.

The photosensor array may comprise a plurality of photosensor elements arranged in a photosensor array having rows and columns. The logic and control circuit of the imaging sensor may function in any known manner, such as in the manner described in U.S. Pat. Nos. 5,550,677; 5,877,897; 6,498,620; 5,670,935; 5,796,094 and/or 6,396,397, and/or U.S. provisional applications, Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/678,375, filed Aug. 1, 2012; Ser. No. 61/676,405, filed Jul. 27, 2012; Ser. No. 61/666,146, filed Jun. 29, 2012; Ser. No. 61/653,665, filed May 31, 2012; Ser. No. 61/653,664, filed May 31, 2012; Ser. No. 61/648,744, filed May 18, 2012; Ser. No. 61/624,507, filed Apr. 16, 2012; Ser. No. 61/616,126, filed Mar. 27, 2012; Ser. No. 61/615,410, filed Mar. 26, 2012; Ser. No. 61/613,651, filed Mar. 21, 2012; Ser. No. 61/607,229, filed Mar. 6, 2012; Ser. No. 61/605,409, filed Mar. 1, 2012; Ser. No. 61/602,878, filed Feb. 24, 2012; Ser. No. 61/602,876, filed Feb. 24, 2012; Ser. No. 61/600,205, filed Feb. 17, 2012; Ser. No. 61/588,833, filed Jan. 20, 2012; Ser. No. 61/583,381, filed Jan. 5, 2012; Ser. No. 61/579,682, filed Dec. 23, 2011; Ser. No. 61/570,017, filed Dec. 13, 2011; Ser. No. 61/568,791, filed Dec. 9, 2011; Ser. No. 61/567,446, filed Dec. 6, 2011; Ser. No. 61/559,970, filed Nov. 15, 2011; and/or Ser. No. 61/552,167, filed Oct. 27, 2011, and/or PCT Application No. PCT/CA2012/000378, filed Apr. 25, 2012, and/or PCT Application No. PCT/US2012/056014, filed Sep. 19, 2012, and/or PCT Application No. PCT/US2012/048800, filed Jul. 30, 2012, and/or PCT Application No. PCT/US2012/048110, filed Jul. 25, 2012, and/or U.S. patent application Ser. No. 13/534,657, filed Jun. 27, 2012 and published Jan. 3, 2013 as U.S. Publication No. US-2013-0002873, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, and/or U.S. provisional applications, Ser. No. 61/650,667, filed May 23, 2012; Ser. No. 61/579,682, filed Dec. 23, 2011; Ser. No. 61/565,713, filed Dec. 1, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010, and/or U.S. patent application Ser. No. 12/508,840, filed Jul. 24, 2009, and published Jan. 28, 2010 as U.S. Pat. Publication No. US 2010-0020170; and/or PCT Application No. PCT/US2012/048110, filed Jul. 25, 2012, and/or U.S. patent application Ser. No. 13/534,657, filed Jun. 27, 2012 and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent applications, Ser. No. 12/091,359, filed Apr. 24, 2008 and published Oct. 1, 2009 as U.S. Publication No. US-2009-0244361; and/or Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or PCT Application No. PCT/US2008/076022, filed Sep. 11, 2008 and published Mar. 19, 2009 as International Publication No. WO 2009/036176, and/or PCT Application No. PCT/US2008/078700, filed Oct. 3, 2008 and published Apr. 9, 2009 as International Publication No. WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent applications, Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. filed Oct. 14, 2004; Ser. No. 60/638,687, filed Dec. 23, 2004, which are hereby incorporated herein by reference in their entireties, a video device 20 for internal cabin surveillance and/or video telephone function, such as disclosed in U.S. Pat. Nos. 5,877,897; 6,690,268 and/or 7,370,983, and/or U.S. patent application Ser. No. filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent applications, Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011 and published Jun. 28, 2012 as U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US11/62755, filed Dec. 1, 2011 and published Jun. 7, 2012 as International Publication No. WO 2012-075250, and/or PCT Application No. PCT/US2012/048993, filed Jul. 31, 2012, and/or PCT Application No. PCT/CA2012/000378, filed Apr. 25, 2012, and/or U.S. patent application Ser. No. 13/333,337, filed Dec. 21, 2011 and published Jun. 28, 2012 as U.S. Publication No. US-2012-0162427, and/or U.S. provisional applications, Ser. No. 61/615,410, filed Mar. 26, 2012; Ser. No. 61/588,833, filed Jan. 20, 2012; Ser. No. 61/570,017, filed Dec. 13, 2011; Ser. No. 61/568,791, filed Dec. 9, 2011; Ser. No. 61/559,970, filed Nov. 15, 2011; Ser. No. 61/540,256, filed Sep. 28, 2011, which are hereby incorporated herein by reference in their entireties.

Optionally, the video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent applications, Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular safety system, the vehicular safety system comprising:
    a plurality of vehicular cameras disposed at a vehicle equipped with the vehicular safety system;

the plurality of vehicular cameras comprising a left side-viewing vehicular camera disposed at a left side of the equipped vehicle;

wherein, with the left side-viewing vehicular camera disposed at the left side of the equipped vehicle, the left side-viewing vehicular camera views at least sideward and rearward of the equipped vehicle;

wherein the left side-viewing vehicular camera is operable to capture image data;

the plurality of vehicular cameras comprising a right side-viewing vehicular camera disposed at a right side of the equipped vehicle;

wherein, with the right side-viewing vehicular camera disposed at the right side of the equipped vehicle, the right side-viewing vehicular camera views at least sideward and rearward of the equipped vehicle;

wherein the right side-viewing vehicular camera is operable to capture image data;

the plurality of vehicular cameras comprising a forward-viewing vehicular camera disposed at a windshield of the equipped vehicle;

wherein, with the forward-viewing vehicular camera disposed at the windshield of the equipped vehicle, the forward-viewing vehicular camera views forward through the windshield of the equipped vehicle;

wherein the forward-viewing vehicular camera is operable to capture image data;

wherein image data captured by the forward-viewing vehicular camera is processed by the vehicular safety system for headlamp control and for at least one selected from the group consisting of (i) lane departure warning and (ii) object detection;

at least one other sensing system of the equipped vehicle;

wherein the at least one other sensing system is operable to capture sensor data;

wherein, responsive at least in part to processing by the vehicular safety system of captured image data and captured sensor data, a potential collision involving the equipped vehicle is determined;

wherein, responsive to determination of the potential collision involving the equipped vehicle, a safety feature of the equipped vehicle changes its condition; and wherein, if actual collision does not occur, the safety feature returns to its condition that existed prior to determination of the potential collision.

2. The vehicular safety system of claim 1, wherein a rear-approaching vehicle that is approaching from rearward of the equipped vehicle is detected responsive at least in part to processing by the vehicular safety system of captured image data and captured sensor data.

3. The vehicular safety system of claim 1, wherein the at least one other sensing system comprises an ultrasonic sensing system of the equipped vehicle.

4. The vehicular safety system of claim 1, wherein the at least one other sensing system comprises an accelerometer sensing system of the equipped vehicle.

5. The vehicular safety system of claim 1, wherein the vehicular safety system generates an alert to a driver of the equipped vehicle responsive to determination of the potential collision.

6. The vehicular safety system of claim 1, wherein the safety feature comprises a reversible adjustment of a position of a headrest of the equipped vehicle responsive to determination of the potential collision.

7. The vehicular safety system of claim 6, wherein the vehicular safety system reversibly moves the headrest forward to limit rearward movement of the head of an occupant of the equipped vehicle should actual collision occur.

8. The vehicular safety system of claim 1, wherein the safety feature comprises a reversible adjustment of a seat belt of a seat of the equipped vehicle.

9. The vehicular safety system of claim 1, wherein the safety feature comprises a reversible adjustment of a seat setting of a seat of the equipped vehicle.

10. The vehicular safety system of claim 1, wherein the vehicular safety system determines whether a driver of the equipped vehicle may be harmed if actual collision occurs.

11. The vehicular safety system of claim 10, wherein the vehicular safety system detects a rear-approaching vehicle and determines the potential collision between the detected rear-approaching vehicle and the equipped vehicle.

12. The vehicular safety system of claim 11, wherein the vehicular safety system determines whether the driver of the equipped vehicle may be harmed if actual collision occurs based at least in part on size of the detected rear-approaching vehicle.

13. The vehicular safety system of claim 11, wherein the vehicular safety system determines whether the driver of the equipped vehicle may be harmed if actual collision occurs based at least in part on shape of the detected rear-approaching vehicle.

14. The vehicular safety system of claim 11, wherein the vehicular safety system determines whether the driver of the equipped vehicle may be harmed if actual collision occurs based at least in part on speed of the detected rear-approaching vehicle.

15. The vehicular safety system of claim 11, wherein the vehicular safety system determines whether the driver of the equipped vehicle may be harmed if actual collision occurs based at least in part on distance to the detected rear-approaching vehicle from the equipped vehicle.

16. The vehicular safety system of claim 11, wherein the vehicular safety system determines whether the driver of the equipped vehicle may be harmed if actual collision occurs based at least in part on rate of approach of the detected rear-approaching vehicle towards the equipped vehicle.

17. The vehicular safety system of claim 11, wherein, responsive at least in part to processing by the vehicular safety system of captured image data and captured sensor data determining that the detected rear-approaching vehicle rearward of the equipped vehicle is following the equipped vehicle within a threshold distance behind the equipped vehicle, the vehicular safety system generates an alert to the driver of the equipped vehicle.

18. A vehicular safety system, the vehicular safety system comprising:

a plurality of vehicular cameras disposed at a vehicle equipped with the vehicular safety system;

the plurality of vehicular cameras comprising a left side-viewing vehicular camera disposed at a left side of the equipped vehicle;

wherein, with the left side-viewing vehicular camera disposed at the left side of the equipped vehicle, the left side-viewing vehicular camera views at least sideward and rearward of the equipped vehicle;

wherein the left side-viewing vehicular camera is operable to capture image data;

the plurality of vehicular cameras comprising a right side-viewing vehicular camera disposed at a right side of the equipped vehicle;

wherein, with the right side-viewing vehicular camera disposed at the right side of the equipped vehicle, the right side-viewing vehicular camera views at least sideward and rearward of the equipped vehicle;

wherein the right side-viewing vehicular camera is operable to capture image data;

the plurality of vehicular cameras comprising a rear-viewing vehicular camera disposed at a rear portion of the equipped vehicle;

wherein, with the rear-viewing vehicular camera disposed at the rear portion of the equipped vehicle, the rear-viewing vehicular camera views at least sideward and rearward of the equipped vehicle;

wherein the rear-viewing vehicular camera is operable to capture image data;

the plurality of vehicular cameras comprising a forward-viewing vehicular camera disposed at a windshield of the equipped vehicle;

wherein, with the forward-viewing vehicular camera disposed at the windshield of the equipped vehicle, the forward-viewing vehicular camera views forward through the windshield of the equipped vehicle;

wherein the forward-viewing vehicular camera is operable to capture image data;

wherein image data captured by the forward-viewing vehicular camera is processed by the vehicular safety system for headlamp control and for at least one selected from the group consisting of (i) lane departure warning and (ii) object detection;

at least one other sensing system of the equipped vehicle;

wherein the at least one other sensing system is operable to capture sensor data;

wherein a rear-approaching vehicle that is approaching from rearward of the equipped vehicle is detected responsive at least in part to processing by the vehicular safety system of captured image data and captured sensor data;

wherein, responsive at least in part to processing by the vehicular safety system of captured image data and captured sensor data, a potential collision involving the equipped vehicle and the rear-approaching vehicle is determined;

wherein, responsive to determination of the potential collision involving the equipped vehicle and the rear-approaching vehicle, a safety feature of the equipped vehicle changes its condition; and wherein, if actual collision does not occur, the safety feature returns to its condition that existed prior to determination of the potential collision.

19. The vehicular safety system of claim 18, wherein the rear-viewing vehicular camera comprises a rear backup camera of the equipped vehicle.

20. The vehicular safety system of claim 18, wherein the at least one other sensing system comprises an ultrasonic sensing system of the equipped vehicle.

21. The vehicular safety system of claim 18, wherein the at least one other sensing system comprises an accelerometer sensing system of the equipped vehicle.

22. The vehicular safety system of claim 18, wherein the vehicular safety system generates an alert to a driver of the equipped vehicle responsive to determination of the potential collision.

23. The vehicular safety system of claim 18, wherein the safety feature comprises a reversible adjustment of a position of a headrest of the equipped vehicle responsive to determination of the potential collision.

24. The vehicular safety system of claim 23, wherein the vehicular safety system reversibly moves the headrest forward to limit rearward movement of the head of an occupant of the equipped vehicle should actual collision occur.

25. The vehicular safety system of claim 18, wherein the safety feature comprises a reversible adjustment of a seat belt of a seat of the equipped vehicle.

26. The vehicular safety system of claim 18, wherein the safety feature comprises a reversible adjustment of a seat setting of a seat of the equipped vehicle.

27. The vehicular safety system of claim 18, wherein the vehicular safety system determines whether a driver of the equipped vehicle may be harmed if actual collision occurs.

28. The vehicular safety system of claim 27, wherein the vehicular safety system determines whether the driver of the equipped vehicle may be harmed if actual collision occurs based at least in part on size of the detected rear-approaching vehicle.

29. The vehicular safety system of claim 27, wherein the vehicular safety system determines whether the driver of the equipped vehicle may be harmed if actual collision occurs based at least in part on shape of the detected rear-approaching vehicle.

30. The vehicular safety system of claim 27, wherein the vehicular safety system determines whether the driver of the equipped vehicle may be harmed if actual collision occurs based at least in part on speed of the detected rear-approaching vehicle.

31. The vehicular safety system of claim 27, wherein the vehicular safety system determines whether the driver of the equipped vehicle may be harmed if actual collision occurs based at least in part on distance to the detected rear-approaching vehicle from the equipped vehicle.

32. The vehicular safety system of claim 27, wherein the vehicular safety system determines whether the driver of the equipped vehicle may be harmed if actual collision occurs based at least in part on rate of approach of the detected rear-approaching vehicle towards the equipped vehicle.

33. The vehicular safety system of claim 27, wherein, responsive at least in part to processing by the vehicular safety system of captured image data and captured sensor data determining that the detected rear-approaching vehicle rearward of the equipped vehicle is following the equipped vehicle within a threshold distance behind the equipped vehicle, the vehicular safety system generates an alert to the driver of the equipped vehicle.

34. A vehicular safety system, the vehicular safety system comprising:

a plurality of vehicular cameras disposed at a vehicle equipped with the vehicular safety system;

the plurality of vehicular cameras comprising a left side-viewing vehicular camera disposed at a left side of the equipped vehicle;

wherein, with the left side-viewing vehicular camera disposed at the left side of the equipped vehicle, the left side-viewing vehicular camera views at least sideward and rearward of the equipped vehicle;

wherein the left side-viewing vehicular camera is operable to capture image data;

the plurality of vehicular cameras comprising a right side-viewing vehicular camera disposed at a right side of the equipped vehicle;

wherein, with the right side-viewing vehicular camera disposed at the right side of the equipped vehicle, the right side-viewing vehicular camera views at least sideward and rearward of the equipped vehicle;

wherein the right side-viewing vehicular camera is operable to capture image data;

the plurality of vehicular cameras comprising a rear-viewing vehicular camera disposed at a rear portion of the equipped vehicle;

wherein, with the rear-viewing vehicular camera disposed at the rear portion of the equipped vehicle, the rear-viewing vehicular camera views at least sideward and rearward of the equipped vehicle;

wherein the rear-viewing vehicular camera is operable to capture image data;

the plurality of vehicular cameras comprising a forward-viewing vehicular camera disposed at a windshield of the equipped vehicle;

wherein, with the forward-viewing vehicular camera disposed at the windshield of the equipped vehicle, the forward-viewing vehicular camera views forward through the windshield of the equipped vehicle;

wherein the forward-viewing vehicular camera is operable to capture image data;

wherein image data captured by the forward-viewing vehicular camera is processed by the vehicular safety system for headlamp control and for at least one selected from the group consisting of (i) lane departure warning and (ii) object detection;

at least one other sensing system of the equipped vehicle;

wherein the at least one other sensing system is operable to capture sensor data;

wherein a rear-approaching vehicle that is approaching from rearward of the equipped vehicle is detected responsive at least in part to processing by the vehicular safety system of captured image data and captured sensor data;

wherein, responsive at least in part to processing by the vehicular safety system of captured image data and captured sensor data, a potential collision involving the equipped vehicle and the rear-approaching vehicle is determined;

wherein the vehicular safety system determines whether a driver of the equipped vehicle may be harmed if actual collision occurs based at least in part on at least one selected from the group consisting of (i) size of the detected rear-approaching vehicle, (ii) shape of the detected rear-approaching vehicle, (iii) speed of the detected rear-approaching vehicle, (iv) distance to the detected rear-approaching vehicle from the equipped vehicle and (v) rate of approach of the detected rear-approaching vehicle towards the equipped vehicle;

wherein, responsive to determination of the potential collision involving the equipped vehicle and the rear-approaching vehicle and to determination that the driver may be harmed if actual collision occurs, a safety feature of the equipped vehicle changes its condition; and wherein, if actual collision does not occur, the safety feature returns to its condition that existed prior to determination of the potential collision.

35. The vehicular safety system of claim 34, wherein the rear-viewing vehicular camera comprises a rear backup camera of the equipped vehicle.

36. The vehicular safety system of claim 34, wherein the at least one other sensing system comprises an ultrasonic sensing system of the equipped vehicle.

37. The vehicular safety system of claim 34, wherein the at least one other sensing system comprises an accelerometer sensing system of the equipped vehicle.

38. The vehicular safety system of claim 34, wherein the vehicular safety system generates an alert to a driver of the equipped vehicle responsive to determination of the potential collision.

39. The vehicular safety system of claim 34, wherein the safety feature comprises a reversible adjustment of a position of a headrest of the equipped vehicle responsive to determination of the potential collision.

40. The vehicular safety system of claim 39, wherein the vehicular safety system reversibly moves the headrest forward to limit rearward movement of the head of an occupant of the equipped vehicle should actual collision occur.

41. The vehicular safety system of claim 34, wherein the safety feature comprises a reversible adjustment of a seat belt of a seat of the equipped vehicle.

42. The vehicular safety system of claim 34, wherein the safety feature comprises a reversible adjustment of a seat setting of a seat of the equipped vehicle.

43. The vehicular safety system of claim 34, wherein the safety feature comprises a reversible adjustment of at least one selected from the group consisting of (i) a seat of the equipped vehicle, (ii) a headrest of the equipped vehicle and (iii) a seat belt of the equipped vehicle.

44. The vehicular safety system of claim 43, wherein the vehicular safety system determines whether the driver of the equipped vehicle may be harmed if actual collision occurs based at least in part on size of the detected rear-approaching vehicle.

45. The vehicular safety system of claim 43, wherein the vehicular safety system determines whether the driver of the equipped vehicle may be harmed if actual collision occurs based at least in part on shape of the detected rear-approaching vehicle.

46. The vehicular safety system of claim 43, wherein the vehicular safety system determines whether the driver of the equipped vehicle may be harmed if actual collision occurs based at least in part on speed of the detected rear-approaching vehicle.

47. The vehicular safety system of claim 43, wherein the vehicular safety system determines whether the driver of the equipped vehicle may be harmed if actual collision occurs based at least in part on distance to the detected rear-approaching vehicle from the equipped vehicle.

48. The vehicular safety system of claim 43, wherein the vehicular safety system determines whether the driver of the equipped vehicle may be harmed if actual collision occurs based at least in part on rate of approach of the detected rear-approaching vehicle towards the equipped vehicle.

49. The vehicular safety system of claim 43, wherein, responsive at least in part to processing by the vehicular safety system of captured image data and captured sensor data determining that the detected rear-approaching vehicle rearward of the equipped vehicle is following the equipped vehicle within a threshold distance behind the equipped vehicle, the vehicular safety system generates an alert to the driver of the equipped vehicle.

* * * * *

UNITED STATES PATENT AND TRADEMARK OFFICE
CERTIFICATE OF CORRECTION

PATENT NO. : 12,286,070 B2
APPLICATION NO. : 18/456576
DATED : April 29, 2025
INVENTOR(S) : Ove J. Salomonsson Page 1 of 1

It is certified that error appears in the above-identified patent and that said Letters Patent is hereby corrected as shown below:

In the Specification

Column 5
Line 49, "5,550,677; 6,498,620;" should be --5,550,677; 5,877,897; 6,498,620;--

Column 6
Line 8, "5,550,677; 5,760,962;" should be --5,550,677; 5,670,935; 5,760,962;--
Line 34, "5,670,935; 5,877,897;" should be --5,670,935; 5,760,962; 5,877,897;--
Line 51, "Ser. No. filed Oct. 14, 2004;" should be --Ser. No. 60/618,686, filed Oct. 14, 2004;--
Line 55, "U.S. Pat. Nos. 5,877,897;" should be --U.S. Pat. Nos. 5,760,962; 5,877,897;--
Lines 56-57, "U.S. patent application Ser. No. filed Jun. 13, 2005" should be --U.S. patent application Ser. No. 10/538,724, filed Jun. 13, 2005--

Column 7
Lines 25-26, "5,677,851; 5,737,226;" should be --5,677,851; 5,708,410; 5,737,226;--

Column 8
Lines 16, "Ser. No. filed Jun. 13, 2005" should be --Ser. No. 10/538,724, filed Jun. 13, 2005--
Lines 53-54, "U.S. patent application Ser. No. filed Jun. 13, 2005" should be --U.S. patent application Ser. No. 10/538,724, filed Jun. 13, 2005--

Signed and Sealed this
Twenty-seventh Day of May, 2025

Coke Morgan Stewart
*Acting Director of the United States Patent and Trademark Office*